US006988111B2

(12) United States Patent
Chow et al.

(10) Patent No.: US 6,988,111 B2
(45) Date of Patent: Jan. 17, 2006

(54) MAPPING BETWEEN PART NUMBERS THAT ARE BASED ON DIFFERENT PART NUMBERING SCHEMES

(75) Inventors: Roland W. Chow, Daly City, CA (US); Arun B. Prakash, Santa Clara, CA (US)

(73) Assignee: i2 Technologies US, Inc., Dallas, TX (US)

( * ) Notice: Subject to any disclaimer, the term of this patent is extended or adjusted under 35 U.S.C. 154(b) by 413 days.

(21) Appl. No.: 09/998,459

(22) Filed: Nov. 29, 2001

(65) Prior Publication Data

US 2003/0101168 A1 May 29, 2003

(51) Int. Cl.
*G06F 17/30* (2006.01)

(52) U.S. Cl. ............... 707/104.1; 707/2; 707/6; 707/10; 705/7; 705/26; 705/27; 705/28; 705/50

(58) Field of Classification Search ............ 707/101, 707/3, 6, 10, 102, 513, 2, 104.1; 705/26, 705/27, 7, 28, 50
See application file for complete search history.

(56) References Cited

U.S. PATENT DOCUMENTS

| 4,870,591 | A * | 9/1989 | Cicciarelli et al. ......... 700/107 |
| 6,505,172 | B1 * | 1/2003 | Johnson et al. ............ 705/27 |
| 6,625,616 | B1 * | 9/2003 | Dragon et al. ............ 707/104.1 |
| 6,871,110 | B1 * | 3/2005 | Yen et al. ............... 700/100 |
| 2002/0004761 | A1 * | 1/2002 | Sekitani ................ 705/26 |
| 2002/0055886 | A1 * | 5/2002 | Hinckley ............... 705/26 |
| 2002/0069222 | A1 * | 6/2002 | McNeely .............. 707/513 |
| 2002/0103721 | A1 * | 8/2002 | Wiesehuegel et al. ...... 705/27 |
| 2002/0128859 | A1 * | 9/2002 | Perkowski ............. 705/1 |
| 2002/0138316 | A1 * | 9/2002 | Katz et al. ............. 705/7 |
| 2002/0156706 | A1 * | 10/2002 | Naish et al. ............ 705/28 |
| 2002/0165701 | A1 * | 11/2002 | Lichtenberg et al. ...... 703/7 |
| 2002/0188528 | A1 * | 12/2002 | Adelman et al. ......... 705/28 |
| 2003/0093380 | A1 * | 5/2003 | Esmailzadeh ........... 705/50 |
| 2003/0115115 | A1 * | 6/2003 | Ouchi ................. 705/27 |

OTHER PUBLICATIONS

Sekitani, "Part retrieving system for production machines utilizing network", US Patent Application Publication, Jan. 2002, pp. 1-19.*

(Continued)

*Primary Examiner*—Thuny N. Pardo
(74) *Attorney, Agent, or Firm*—Brian E. Harris; James E. Walton

(57) ABSTRACT

A computer-implemented method for mapping between part numbers that are based on different part numbering schemes includes receiving a first part number associated with an item, the first part number associated with the item being defined according to a first part numbering scheme. A database is searched for one or more second part numbers that are associated with the item and also cross-referenced to the first part number associated with the item, the one or more second part numbers associated with the item being defined according to one or more corresponding second part numbering schemes. In response to identifying the one or more second part numbers associated with the item, a database is searched for a third part number that is associated with the item and also cross-referenced to at least one second part number associated with the item, the third part number associated with the item being defined according to a third part numbering scheme, the first part number associated with the item being mapped to the third part number associated with the item through the at least one second part number associated with the item.

7 Claims, 5 Drawing Sheets

OTHER PUBLICATIONS

Wiesehuegel et al., "Dynamic catalog for on-line offering and bid system", US Patent Application Publication, Aug. 2002, pp. 1-8.*

Khan, "Methods and systems for sourcing bill of material and data handling configurations software", US Patent Application Publication, Mar, 2002, pp. 1-11.*

Perkowski, "Method of and system for creating and managing UPN/TM/PD/URL data links relating to the consumer products of a manufacturer . . . ", US Patent Application Publication, Jan. 2002, pp. 1-42.*

Lichtenberg et al. "Method of configuring a product", US Patent Application Publication, Nov. 2002, pp. 1-36.*

Adelman et al., "Part mapping system and method", US Patent Application Publication, Dec. 2002, pp. 1-20.*

* cited by examiner

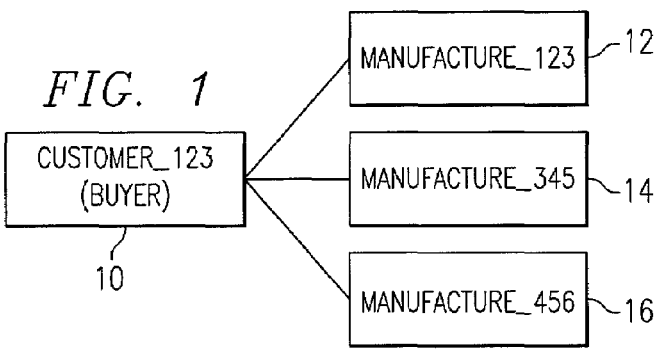
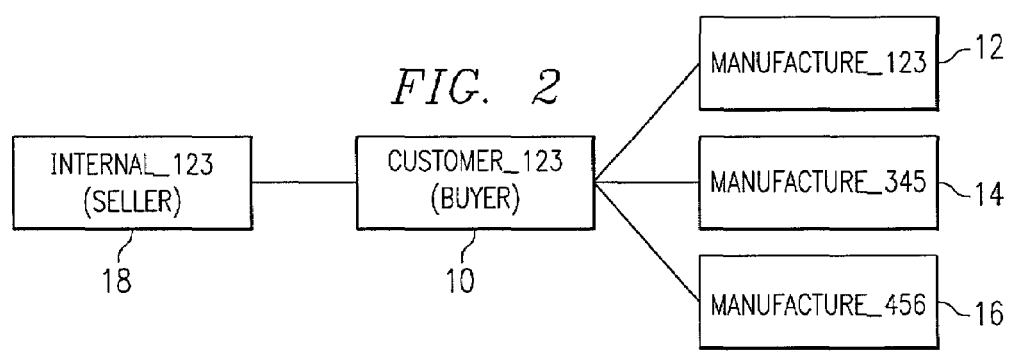
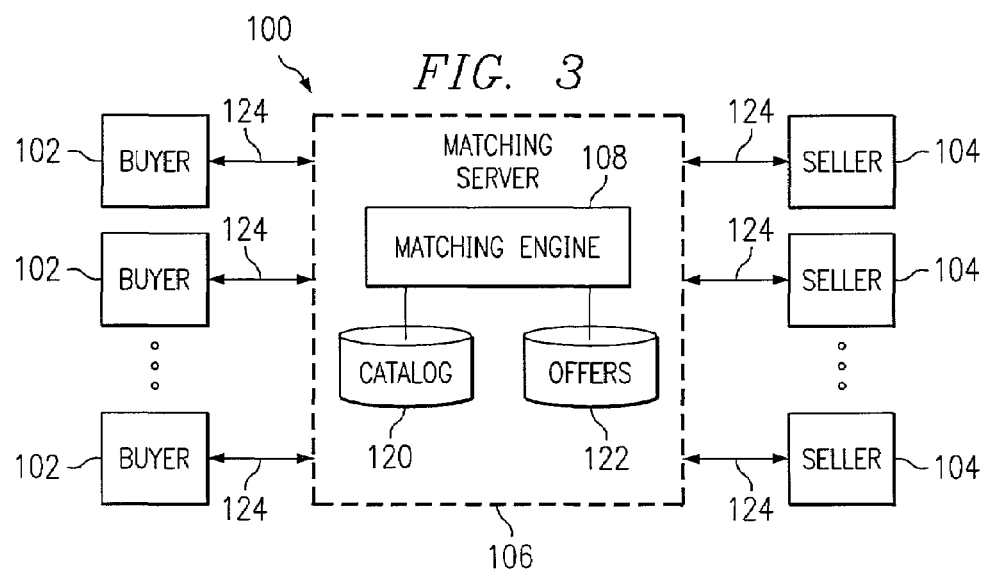

| CUSTOMER PART NUMBER | MANUFACTURER PART NUMBER |
|---|---|
| CUSTOMER_123 | |
| CUSTOMER_345 | |
| | |
| INTERNAL PART NUMBER | MANUFACTURER PART NUMBER |
| | |
| | |
| | |

*FIG. 8A*

| CUSTOMER PART NUMBER | MANUFACTURER PART NUMBER |
|---|---|
| CUSTOMER_123 | MANU_123 |
| CUSTOMER_345 | MANU_456 |
| | MANU_112 |
| INTERNAL PART NUMBER | MANUFACTURER PART NUMBER |
| IPN_452 | |
| IPN_1413 | |
| IPN_423 | |

*FIG. 8B*

| CUSTOMER PART NUMBER | MANUFACTURER PART NUMBER |
|---|---|
| CUSTOMER_123 | MANU_123 |
| CUSTOMER_345 | MANU_456 |
| | MANU_112 |
| INTERNAL PART NUMBER | MANUFACTURER PART NUMBER |
| IPN_452 | MANU_123 |
| IPN_1413 | MANU_456 |
| IPN_423 | MANU_747 |

*FIG. 8C*

MAPPING BETWEEN PART NUMBERS THAT ARE BASED ON DIFFERENT PART NUMBERING SCHEMES

TECHNICAL FIELD OF THE INVENTION

The present invention relates in general to computer-implemented procurement and, more particularly, to mapping between part numbers that are based on different part numbering schemes.

BACKGROUND OF THE INVENTION

In certain procurement transactions, sellers such as high-tech contract manufacturers or electronics vendors receive Purchase Orders (POs) or Requests For Quotation (RFQs), often involving Bills Of Materials (BOMs), from customers. Typically, in such transactions, the item numbers for the parts in the PO or RFQ are based on the part numbering scheme of the customer. Consequently, in order to process a customer's PO or RFQ, a seller may first need to convert each of the customer part numbers to a corresponding internal part number based on the seller's own, internal part numbering scheme.

For example, FIG. 1 illustrates how a customer part number 10 for an item can be mapped to a number of different manufacturer part numbers 12, 14, 16 for the same item. For the seller to convert the customer part number 10 to an internal part number for that item, the seller creates a new part number that has a one-to-one correspondence to the customer part number 10 for that item. FIG. 2 illustrates such an approach, in which the seller has created a new internal part number 18 that corresponds directly to the customer part number 10 for the item.

However, certain problems may exist with an approach such as that shown in FIG. 2. For example, since the seller's internal part number 18 is uniquely derived for the particular customer part number 10, that internal part number 18 is not readily associated with any of the seller's other internal part numbers for the item. In other words, internal part number 18 is not effectively tied back to the data in the seller's other internal systems. For example, the approach illustrated by FIG. 2 limits the seller's ability to determine whether the customer part number 10 is associated with one or more internal part numbers in any of the seller's existing contracts unless, for example, the seller goes through a manual exercise of matching the internal part numbers in its contracts to the new internal part number 18. As a result, the mapping approach illustrated by FIG. 2 does not allow a seller to effectively utilize its internal part numbers to aggregate material purchase volumes in order to formulate more accurate item prices using known leveraged volume aggregation techniques. Furthermore, the one-to-one mapping approach illustrated by FIG. 2 results in part number proliferation, and the resulting quantity of internal part numbers becomes exceedingly complex and costly for a seller to manage and maintain, due to the fact that a new internal part number must be created for every customer part number.

SUMMARY OF THE INVENTION

According to the present invention, problems and disadvantages associated with previous part number mapping techniques may be reduced or eliminated.

According to one example embodiment of the present invention, a computer-implemented method for mapping between part numbers that are based on different part numbering schemes includes receiving a first part number associated with an item, the first part number associated with the item being defined according to a first part numbering scheme. A database is searched for one or more second part numbers that are associated with the item and also cross-referenced to the first part number associated with the item, the one or more second part numbers associated with the item being defined according to one or more corresponding second part numbering schemes. In response to identifying the one or more second part numbers associated with the item, a database is searched for a third part number that is associated with the item and also cross-referenced to at least one second part number associated with the item, the third part number associated with the item being defined according to a third part numbering scheme, the first part number associated with the item being mapped to the third part number associated with the item through the at least one second part number associated with the item.

Certain embodiments of the present invention may provide one or more technical advantages. For example, the present invention may allow a user to determine if a customer part number is associated with any internal part numbers in the user's other existing contracts. As a result, the present invention may allow a user to more effectively utilize internal part numbers to aggregate material purchase volumes in order to formulate more accurate item prices using leveraged volume aggregation techniques. Also, the present invention may inhibit part number proliferation, which may help to reduce the complexity and cost for a user to manage and maintain a database of part numbers. The present invention may also allow users of computer-implemented procurement systems to translate, cross-reference, or otherwise map between part numbers using a "universal" part numbering scheme, or Lingua Franca of sorts (i.e. language used over a wide geographic area as a means of communication—generally to facilitate commerce and trade—by people who have no other language in common). In a similar manner, certain embodiments of the present invention may advantageously facilitate commerce and trade. Certain embodiments of the present invention may provide some, all, or none of these advantages. One or more other technical advantages of the present invention may be readily apparent to those skilled in the art from the figures, description and claims included herein.

BRIEF DESCRIPTION OF THE DRAWINGS

For a more complete understanding of the present invention and its advantages, reference is now made to the following descriptions, taken in conjunction with the accompanying drawings, in which:

FIG. 1 illustrates a known approach for mapping a customer part number for an item to a number of different manufacturer part numbers for the same item;

FIG. 2 further illustrates the approach depicted in FIG. 1;

FIG. 3 illustrates an example computer-implemented system for retrieving information using matching criteria that can be used in certain embodiments of the present invention;

FIGS. 8A through 8C illustrate a series of example computer-implemented displays that can be used in certain embodiments to implement the example methods illustrated in FIGS. 3 through 6E.

DESCRIPTION OF EXAMPLE EMBODIMENTS

Figure 4:
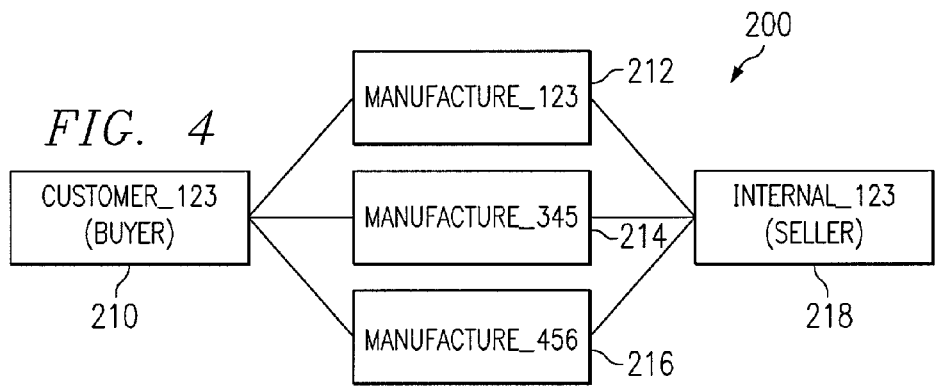
FIG. 4 illustrates an example computer-implemented method for mapping customer part numbers to internal part numbers that can be used in certain embodiments of the present invention.

FIG. 3 illustrates an example computer-implemented system 100 for retrieving information using matching criteria that can be used in certain embodiments of the present invention. System 100 can include one or more buyers 102, one or more sellers 104, and at least one matching server 106 associated with a website, electronic marketplace, or other environment accessible to buyers 102 and sellers 104. In general, matching server 106 receives a search request from a buyer 102 that expresses the procurement needs of buyer 102, for example, needs for one or more target products, services, documents, or other items that can be obtained from one or more sellers 104 through a marketplace associated with matching server 106.

The needs of the buyer 102 can be expressed in terms of matching criteria, such as one or more parameters relating to each of the target items. In response to the search request, matching server 106 uses an associated matching engine 108 to apply the matching criteria against a catalog database 120. Catalog database 120 may contain information concerning items that are currently or potentially available from one or more sellers 104. Instead or in addition, matching engine 108 can apply the matching criteria against an offers database 122 that contains pending offers from one or more sellers 104. Databases 120 and 122 may each include one or more databases, memories, or other data storage arrangements at one or more locations, and reference to database 120 or 122 is meant to encompass all such arrangements as are appropriate. Matching engine 108 retrieves information concerning available items from the appropriate database 120 or 122, according to the parameters that are matched, and returns the results to buyer 102. The results can be sorted based on the parameters input for the target item that reflect their relevance to buyer 102, preferences of buyer 102, or other considerations, to allow buyer 102 to make procurement or other appropriate decisions.

Buyers 102 can be any suitable entities that access matching server 106, either autonomously or relying on input from associated persons, to discover information concerning one or more available items in connection with a procurement or other activity. Sellers 104 can be any suitable entities that provide information to matching server 106 concerning the available items. Buyers 102, sellers 104, and matching server 106 can be coupled to one another using links 124. For example, links 124 can each include one or more local area networks (LANs), metropolitan area networks (MANs), wide area networks (WANs), at least a portion of the Internet, or any other suitable wireline, optical, wireless, or other type of link. In one aspect of this embodiment, matching server 106 is associated with an electronic business-to-business ("B2B") marketplace that facilitates B2B transactions between buyers 102 and sellers 104 over the Internet. Although matching server 106 is described primarily, for illustrative purposes, as separate from buyers 102 and sellers 104, matching server 106 can share one or more computer resources or other appropriate resources with one or more buyers 102 and/or sellers 104 according to particular needs. For example, a particular seller 104 may support its own matching server 106 and an associated local database (not explicitly shown) to map between part numbers according to the present invention.

More particularly, in one aspect of the present invention, matching server 106 can receive a search request from a user (e.g., seller 104) that expresses the needs of the user, for example, a search request for all manufacturer part numbers stored in database 120 and/or database 122 that can be cross-referenced to a buyer's customer part number. The search request may include associated part description information. Alternatively, where matching server 106 is associated with a particular user (e.g., seller 104) for example, the user can submit such a search request to a local database containing part information for one or more manufacturers. The scope of the present invention is not limited by the location or type of database used to store part information, or the method or type of system used to search for, match, and retrieve part information.

FIG. 4 illustrates an example computer-implemented method 200 that can be used in certain embodiments of the present invention. Essentially, also referring to FIG. 3, upon receiving a part number 210 and possibly associated part description information for a part from a buyer 102 (e.g., included within a BOM associated with a PO or RFQ), a user such as seller 104 performs a database search to identify and retrieve all manufacturer part numbers that correspond to that part. For this example, the search identifies for seller 104 three manufacturer part numbers 212, 214, 216 for the part. The search also identifies and retrieves for seller 104 the seller's internal part number 218 that corresponds to all of the manufacturer part numbers 212, 214, 216 identified for the part. Ideally, one internal part number exists for all the manufacturer part numbers identified. Those skilled in the art will appreciate that although part numbers are primarily described, the present invention contemplates any suitable items and any suitable identifiers for those items.

For the example illustrated by FIG. 4, the seller's internal part number 218 corresponds to the three manufacturer part numbers 212, 214, 216. Also, the buyer's customer part number 210 corresponds to the three manufacturer part numbers 212, 214, 216. Based on this mapping of the manufacturer part numbers 212, 214, 216 to both the customer part number 210 and the internal part number 218, the customer part number 210 and the internal part number 218 can be considered equivalent for the same application. As a result of this correspondence between the manufacturer part numbers 212, 214, 216 and internal part number 218, internal part number 218 may be tied to any of the seller's existing contracts, POs, RFQs, or other demand information, which may give the seller 104 substantially immediate visibility over other contracts, POs, RFQs, or other demand information for the customer part number 210 in other transactions. Consequently, the seller 104 may be in a better position to obtain higher volume leverage discounts, more favorable contractual pricing, and more accurate supply and demand information in order to better collaborate with its suppliers (e.g., manufacturers). Part number mapping according to the present invention may be used to identify a single internal part number corresponding to a single customer part number or may be used to identify multiple internal part numbers corresponding to multiple customer part numbers, such as might be received in a BOM associated with a PO or RFQ.

Figure 5A:
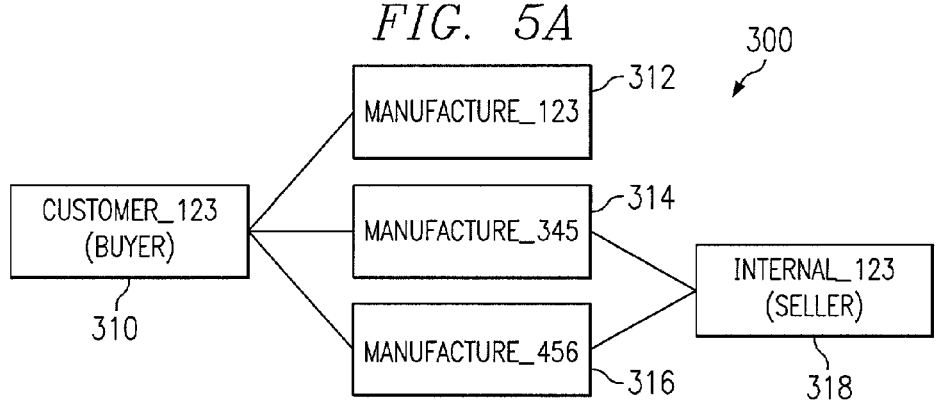
FIGS. 5A and 5B illustrate a different aspect of the example method depicted in FIG. 4.
Figure 5B:
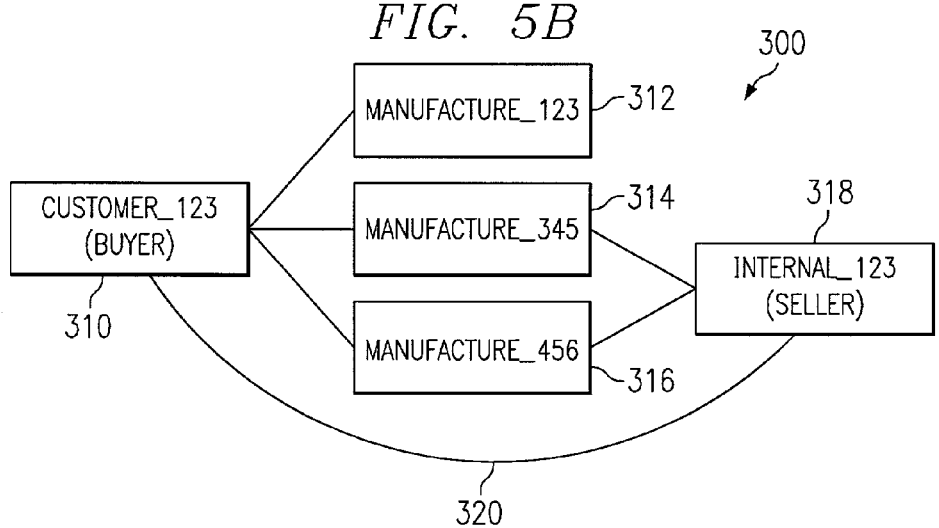

FIGS. 5A and 5B illustrate a different aspect of the example method depicted in FIG. 4. Referring to FIG. 5A, for illustrative purposes, it may be assumed that a search for manufacturer part numbers that match a part associated with a customer part number 310 has been performed (e.g., such as the search described above with respect to FIG. 4), and as a result, manufacturer part numbers 312, 314, 316 have been identified. In some cases, the mapping between a customer part number and a manufacturer part number may be provided in the form of, for example, an approved manufacturer list (AML). Also, it may be assumed that a search for one or more internal part numbers corresponding to the identified manufacturer part numbers 312, 314, 316 has been performed. As FIG. 5A shows, a more complex mapping problem arises if such a search identifies one or more internal part number (e.g., 318) that do not correspond to all of the manufacturer part numbers 312, 314, 316 thus identified. In this case, the seller's internal part number 318 is not the complete equivalent of customer part number 310, although some overlap exists (i.e. manufacturer part numbers 314, 316) between internal part number 318 and customer part number 310.

FIG. 5B helps illustrate how a problem related to a partially equivalent mapping (e.g., as shown in FIG. 5A) of a customer part number to a seller's internal part number via one or more manufacturer part numbers can be resolved according to the present invention. Notably, although the example embodiment illustrated by FIG. 5A shows a partially equivalent mapping of two out of three possible matches, the present invention is not limited to such a situation. In other words, a partially equivalent mapping of a customer part number to a seller's internal part number via one or more manufacturer part numbers may include, for example, one out of two possible matches, three out of five possible matches, one hundred fifty out of two hundred possible matches (e.g., where a complex BOM is involved) or any other number of matches, provided some overlap exists between the customer part number and the internal part number via one or more manufacturer part numbers.

Referring to FIG. 5B, an approval process can be invoked to reconcile a partially equivalent mapping such as that shown in FIG. 5A. For example, participants in such an approval process can decide beforehand just what overlap conditions will be deemed to constitute a "match" between a customer part number and a seller's internal part number. If these conditions are satisfied, a complete mapping (represented by link 320) between the customer part number (e.g., 310) and the internal part number (e.g., 318) can be assumed, at least for the project, transaction, or other application involved.

As an example, an approval process for reconciling partially equivalent part number mapping can include the use of certain business rules. Different business rules may apply to different applications. Based on the extent to which the applicable business rules are satisfied by the overlap between a customer part number and a seller's internal part number via one or more manufacturer part numbers (e.g., greater than 70% of the business rules satisfied), a determination can be made about whether a partially equivalent mapping can be considered a completely equivalent mapping for the application. If so, a direct correspondence can be established (e.g., represented as a cross-referencing link 320 between the customer part number and the internal part number), at least for the particular application.

Figure 6A:
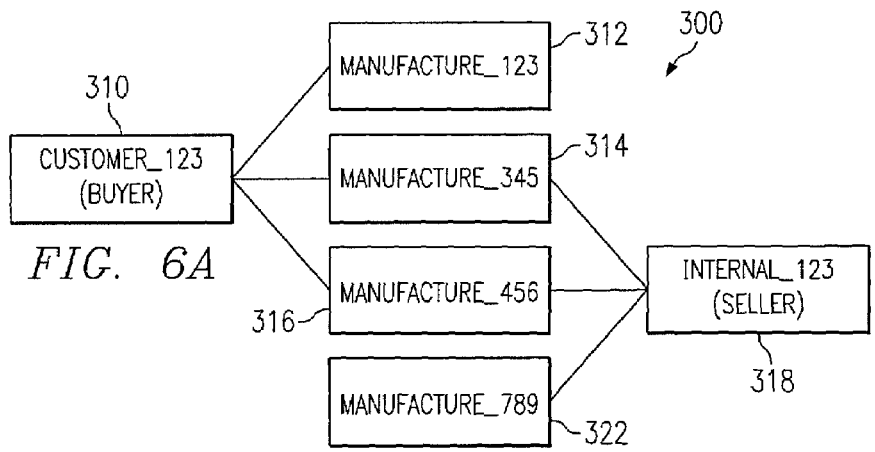
FIGS. 6A through 6E illustrate additional aspects of the example method depicted in FIG. 4.

FIGS. 6A through 6E illustrate additional aspects of the example method illustrated in FIG. 4. Referring to FIG. 6A, assume for example that a customer part number 310 corresponds to a first set of manufacturer part numbers 312, 314, 316 that has only a partial overlap with a second set of manufacturer part numbers 314, 316, 322 corresponding to a seller's internal part number 318. In this example there is an overlap (314, 316) between the manufacturer part numbers 312, 314, 316 corresponding to customer part number 310 and the manufacturer part numbers 314, 316, 322 corresponding to internal part number 318. There is, however, no overlap for manufacturer part number 312 corresponding to customer part number 310 or for manufacturer part number 322 corresponding to internal part number 318.

An example that illustrates how this problem can arise is the case where a set of manufacturer part numbers already referenced by a seller was provided from a previous application. For example, assume that a particular manufacturing operation required manufacturer part number 314 (manufacture_345), 316 (manufacture_456), or 322 (manufacture_789) to be used. These manufacturer part numbers could be for a particular type of resistor fabricated by three different manufacturers. These manufacturers' resistors may have been selected because they perform within required specifications for the application (e.g., their circuit characteristics match certain requirements imposed with respect to operating temperature, pressure, and load). Also assume a buyer 102 having customer part number 310 (customer_123) for the desired part informs a seller 104 that, at least for this application, buyer 102 is only interested in either manufacturer part number 312 (manufacture_123), 314 (manufacture_345), or 316 (manufacture_456), because buyer 102 has no relationship with the supplier of manufacturer part number 322 (manufacture_789) or manufacturer part number 322 (manufacture_789) does not perform within the tolerances required by the manufacturing application. In accordance with the present invention, this type of overlap problem may be resolved in a number of ways.

Figure 6B:
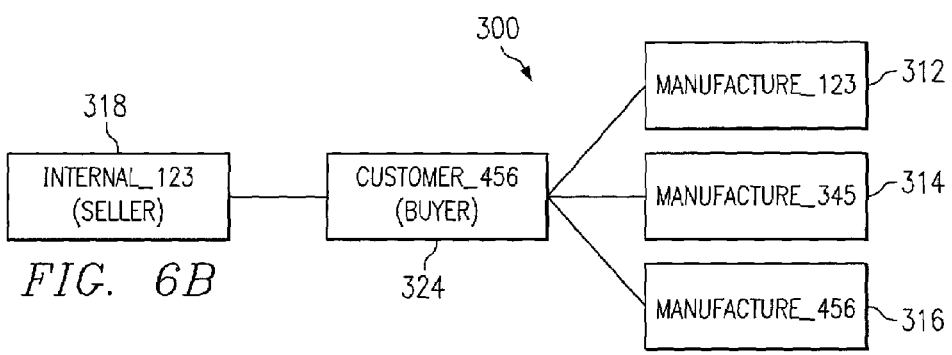

FIG. 6B illustrate how a more complex problem related to a partially equivalent mapping (e.g., as shown and described with respect to FIG. 6A) of a customer part number to an internal part number via one or more manufacturer part numbers can be resolved in accordance with the present invention. As shown by the example solution depicted in FIG. 6B, a new customer part number 324 (customer_456) can be created for a seller's internal part number 318 (internal_123), which can be re-mapped to manufacturer part numbers 312, 314, 316 of interest. For improved visibility with respect to the part involved, buyer 102 having customer part number 310 may also re-map its internal systems to the new customer part number 324.

Figure 6C:
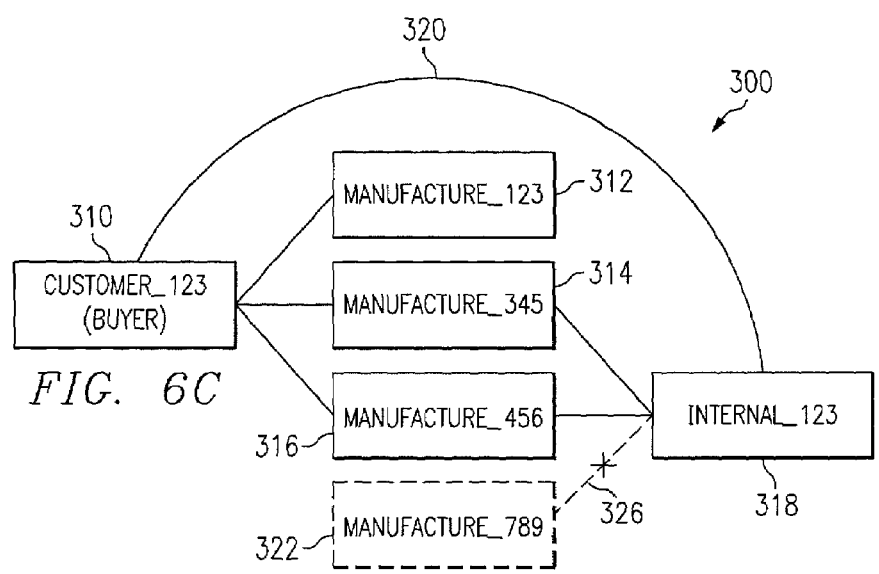

FIG. 6C illustrates another solution to the more complex problem related to a partially equivalent mapping (e.g., as shown and described with respect to FIG. 6A) which can be implemented in accordance with the present invention. For example, an engineering change request or similar workflow can be conducted on the seller side to remove a link 326 of problematic manufacturer part number 322 (manufacture_789) from the set of manufacturer part numbers mapped to the seller's internal part number 318, and also to create a link 320 between internal part number 318 and customer part number 310 similar to the approach described above with reference to FIG. 5B.

Figure 6D:
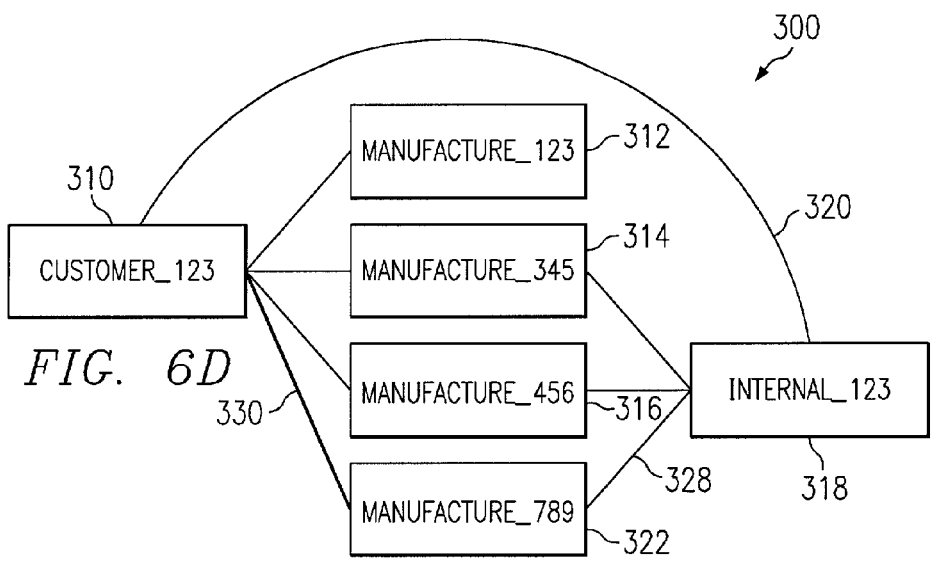

FIG. 6D illustrates yet another solution to the more complex problem related to a partially equivalent mapping (e.g., as shown and described with respect to FIG. 6A) which can be implemented in accordance with the present invention. For example, an engineering change request or similar workflow may be conducted on the buyer side to add a link 330 of problematic manufacturer part number 322 (manufacture_789) to the set of manufacturer part numbers mapped to customer part number 310, and also to create a link 320 between customer part number 310 and internal part number 318 similar to the approach described above with reference to FIG. 5B.

Figure 6E:
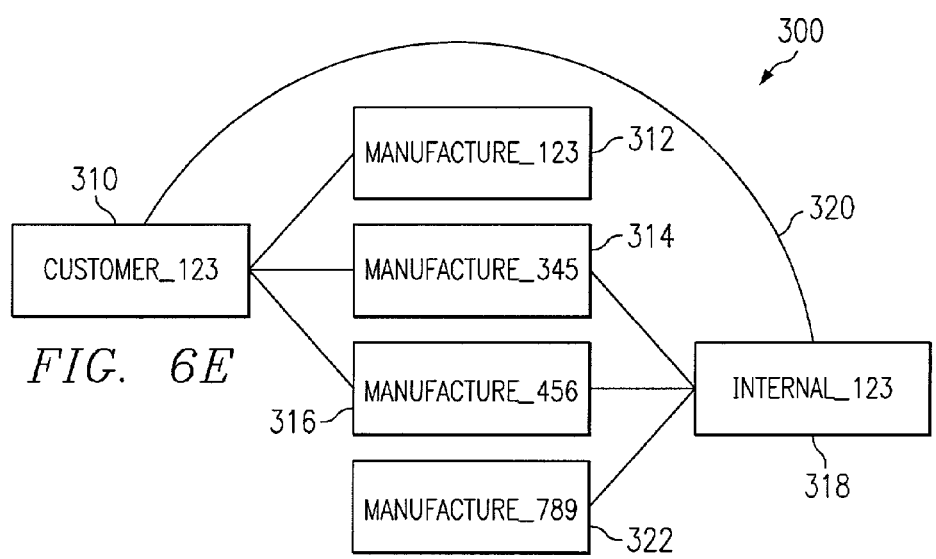

FIG. 6E illustrates yet another solution to the more complex problem related to a partially equivalent mapping (e.g., as shown and described with respect to FIG. 6A) which can be implemented in accordance with the present invention. For example, a link 320 may be created between customer part number 310 and internal part number 318 without initiating an engineering change request or similar workflow to remove link 326 as described above with reference to FIG. 6C or add link 330 as described above with reference to FIG. 6D. This example solution may be suitable, for example, if a seller 104 fabricates a product using manufacturer part number 322 (manufacture_789) that would not impact the quality or technology of the application for customer part number 310 (customer_123). This example solution may not be suitable, however, if the product performance using manufacturer part number 322 (manufacture_789) would be out of tolerance for the application for customer part number 310 (customer_123). As such, although this example solution may not change customer part number to manufacturer part number or internal part number to manufacturer part number relationships, from an execution standpoint, if seller 104 fabricates a product for buyer 102 requiring used of customer part number 310 (customer_123), then seller 104 may use, for example, manufacturer part number 322 (manufacturer_789) but not manufacturer part number 312 (manufacturer_123). Use of manufacturer part number 322 (manufacture_789) will not be a problem if this part performs within the buyer's specifications. Ideally, if this part performs within the buyer's specifications, buyer 102 may create a mapping between customer part number 310 (customer_123) and manufacturer part number 322 (manufacture_789). However, data integrity is typically an issue in complex manufacturing environments.

In determining how to treat different part number configurations, as described above, the seller's business rules and processes may be the controlling factor. As such, factors to be considered may include, in any suitable combination and without limitation: (1) whether buyer 102 has any special pricing volume arrangements with its suppliers for some manufacturer part numbers, (2) whether seller 104 has any special pricing volume arrangements with its suppliers for some manufacturer part numbers described in the buyer's AML, (3) whether the suggested alternative manufacturer part numbers meet the buyer's product requirements from a specification and tolerance perspective, (4) the type of margins that may be offered to buyer 102 (i.e. how strategically valuable buyer 102 is), (5) whether the product to be fabricated for buyer 102 is a standard product or a custom-made product, (6) whether seller 104 has other projects that may use the same manufacturer part numbers, and (7) whether the manufacturer part numbers on the buyer's AML are easily sourced. These or any other appropriate factors may be incorporated into a workflow involving appropriate approvals to determine how customer part numbers may be associated with a seller's internal part numbers.

Figure 7:
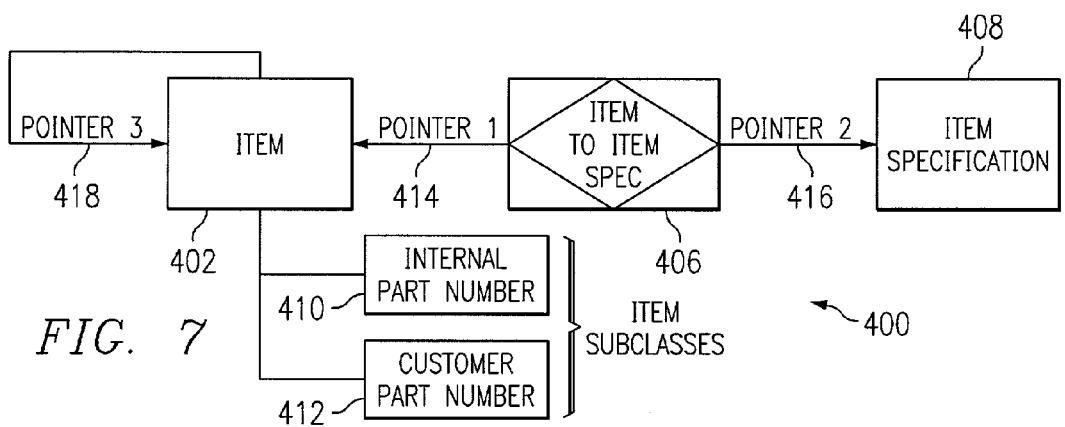
FIG. 7 illustrates an example object-oriented data model that can be used for mapping customer part numbers to internal part numbers in certain embodiments of the present invention.

FIG. 7 illustrates an example object-oriented data model 400 that can be used for mapping customers' part numbers to internal part numbers, in accordance with the present invention. For example, example data model 400 can be used to implement a software application program or method used in conjunction with database 120 or 122 to map customer part numbers to internal part numbers as described above. The example data model 400 shown can be used to map a customer part number 412 to one or more item specifications 408 via one or more item to item specifications associated with an item to item specification class 406. Item to item specifications may be instances of item to item specification class 406. Programming code can be generated to implement data model 400 and identify all internal part numbers 410 that match the one or more particular item specifications 408 via the item to item specification class 406. For example, "Pointer 1" (414) represents a reference to a memory location or address (e.g., in database 120 or 122) that contains information about a specific part associated with customer part number 412. "Pointer 2" (416) represents a reference to a memory location or address that contains specification information identifying the item located at the address referenced by Pointer 1. Consequently, each item to item specification associated with item to item specification class 406 is used to map the information at the memory address referenced by Pointer 1 (414) with the information at the memory address referenced by Pointer 2 (416). In this way, data model 400 can identify all internal part numbers 410 for an item 402 that match the item specifications 408 using the item to item specification class 406. Furthermore, referring to the overlapping, partial mapping solution illustrated by FIGS. 5A and 5B, a third pointer (418) can be used to reference a memory location or address of each item 402, which includes mapping information to cross-reference respective customer part numbers 412 with respective internal part numbers 410.

FIGS. 8A through 8C illustrate a series of example computer-implemented displays that can be used in certain embodiments to visualize the example methods illustrated in FIGS. 3 through 6E. In general, a GUI associated with a software application interacts with the user using displays that include visual icons to represent features of the application. GUIs typically include "widgets" that allow a user to interact with the associated software application or underlying operating system. Widgets can be icons, menus, buttons, selection boxes, scroll bars, and other design elements that can be used (e.g., typically by a user "clicking" on them with a mouse pointer) to interact with the software application or operating system. In this regard, the displays shown in FIGS. 8A through 8C can be displayed on the screen of a computer monitor by a GUI associated with a software application.

Referring to FIG. 8A, it can be assumed that a user (e.g., seller 104) is presented with a computer-implemented display of all customer part numbers of interest. However, for illustrative purposes, only two such customer part numbers are shown. A customer part number of interest is shown as element 412 in the example data model 400 of FIG. 7.

Referring to FIG. 8B, it can be assumed that the user has selected customer part number customer_123. In response to a search query initiated by the user selecting customer_123, matching server 106 returns (e.g., from database 120 or 122) to the user for display the complete set of manufacturer part numbers corresponding to customer_123 and a set of internal part numbers that possibly correspond to customer_123 according to one or more applicable business rules. For example, in FIG. 8B, a seller 104 is presented with a computer-implemented display that shows matches between the selected customer part number (customer_123) and three manufacturer part numbers (manu_123, manu_456, manu_112), and possible matches between the selected customer part number and three internal part numbers (IPN_452, IPN_1413, IPN_423). If the user had selected a customer part number other than customer_123 in FIG. 7A, then another set of manufacturer part numbers and internal part numbers would have been dynamically determined and displayed as in FIG. 8B.

Referring to FIG. 8C, it can be assumed that the user has selected the bottom internal part number (IPN_423) shown and, in response, matching server 106 returns (e.g., from database 120 or 122) to the user for display the complete set of manufacturer part numbers corresponding to IPN__423. If the user had selected an internal part number other than IPN__423 in FIG. 8B, then another set of manufacturer part numbers would have been dynamically determined and displayed as in FIG. 8C. As FIG. 8C illustrates, in this example customer__123 and IPN__423 only partially overlap (manu__123 and manu__456), analogous to the situation illustrated in FIGS. 6A through 6E.

Although example embodiments of the present invention have been illustrated in the accompanying drawings and described in the foregoing description, it will be understood that the invention is not limited to the embodiment disclosed, but is capable of numerous rearrangements, modifications and substitutions without departing from the spirit of the invention as set forth and defined by the following claims.

What is claimed is:

1. A computer-implemented method for mapping between part numbers that are based on different part numbering schemes, comprising:

receiving a first part number associated with an item, the first part number associated with the item being defined according to a first part numbering scheme;

searching a database for one or more second part numbers that are associated with the item and also cross-referenced to the first part number associated with the item, the one or more second part numbers associated with the item being defined according to one or more corresponding second cart numbering schemes; and in response to identifying the one or more second part numbers associated with the item, searching a database for a third part number that is associated with the item and also cross-referenced to at least one second part number associated with the item, the third part number associated with the item being defined according to a third part numbering scheme, the first part number associated with the item being mapped to the third part number associated with the item through the at least one second part number associated with the item, wherein:

the first part number is not completely mapped to the third part number in that a plurality of second part numbers are associated with the item, at least some of these second part numbers are cross-referenced to the first part number but not cross-referenced to the third part number, and at least some of these second part numbers are cross-referenced to the third part number but not cross-referenced to the first part number; and the method further comprises:

determining a percentage of second part numbers to which both the first part number and the third part number are cross-referenced; and if the determined percentage is greater than a predetermined value, considering the third part number equivalent to the first part number for purposes of a particular application for the first part number.

2. A computer-implemented method for mapping between part numbers that are based on different part numbering schemes, comprising:

receiving a first part number associated with an item, the first part number associated with the item being defined according to a first part numbering scheme;

searching a database for one or more second part numbers that are associated with the item and also cross-referenced to the first part number associated with the item, the one or more second part numbers associated with the item being defined according to one or more corresponding second part numbering schemes;

in response to identifying the one or more second part numbers associated with the item, searching a database for a third part number that is associated with the item and also cross-referenced to at least one second part number associated with the item, the third part number associated with the item being defined according to a third part numbering scheme, the first part number associated with the item being mapped to the third part number associated with the item through the at least one second part number associated with the item;

accessing a first item to item specification to map the first part number to specification information for the item associated with the first part number, the first item to item specification having a first pointer to information identifying the item associated with the first part number and a second pointer to the specification information for the item associated with the first part number; and accessing a second item to item specification to map the specification information for the item associated with the third part number to the third part number, the second item to item specification having a first pointer to information identifying the item associated with the third part number and a second pointer to specification information for the item associated with the third part number, the specification information for the item associated with the third part number substantially matching the specification information for the item associated with the first part number.

3. A computer-implemented system for mapping between part numbers that are based on different part numbering schemes, comprising:

one or more databases containing a plurality of part numbers associated with a plurality of items;

one or more processors coupled to the database and collectively operable to receive a first part number associated with an item, the first part number associated with the item being defined according to a first part numbering scheme;

search a database for one or more second part numbers that are associated with the item and also cross-referenced to the first part number associated with the item, the one or more second part numbers associated with the item being defined according to one or more corresponding second part numbering schemes; and in response to identifying the one or more second part numbers associated with the item, search a database for a third part number that is associated with the item and also cross-referenced to at least one second part number associated with the item, the third part number associated with the item being defined according to a third part numbering scheme, the first part number associated with the item being mapped to the third part number associated with the item through the at least one second part number associated with the item, wherein:

the first part number is not completely mapped to the third part number in that a plurality of second part numbers are associated with the item, at least some of these second part numbers are cross-referenced to the first part number but not cross-referenced to the third part number, and at least some of these second part numbers are cross-referenced to the third part number but not cross-referenced to the first part number; and the one or more processors are further operable to:
- determine a percentage of second part numbers to which both the first part number and the third part number are cross-referenced; and
- if the determined percentage is greater than a predetermined value, consider the third part number equivalent to the first part number for purposes of a particular application for the first part number.

4. A computer-implemented system for mapping between part numbers that are based on different part numbering schemes, comprising:

one or more databases containing a plurality of part numbers associated with a plurality of items;

one or more processors coupled to the database and collectively operable to receive a first part number associated with an item, the first part number associated with the item being defined according to a first part numbering scheme;

search a database for one or more second part numbers that are associated with the item and also cross-referenced to the first part number associated with the item, the one or more second part numbers associated with the item being defined according to one or more corresponding second part numbering schemes;

in response to identifying the one or more second part numbers associated with the item, search a database for a third part number that is associated with the item and also cross-referenced to at least one second part number associated with the item, the third part number associated with the item being defined according to a third part numbering scheme, the first part number associated with the item being mapped to the third part number associated with the item through the at least one second part number associated with the item;

access a first item to item specification to map the first part number to specification information for the item associated with the first part number, the first item to item specification having a first pointer to information identifying the item associated with the first part number and a second pointer to the specification information for the item associated with the first part number; and access a second item to item specification to map the specification information for the item associated with the third part number to the third part number, the second item to item specification having a first pointer to information identifying the item associated with the third part number and a second pointer to specification information for the item associated with the third part number, the specification information for the item associated with the third part number substantially matching the specification information for the item associated with the first part number.

5. Software for mapping between part numbers that are based on different part numbering schemes, the software being embodied in computer-readable media and when executed operable to:

receive a first part number associated with an item, the first part number associated with the item being defined according to a first part numbering scheme;

search a database for one or more second part numbers that are associated with the item and also cross-referenced to the first part number associated with the item, the one or more second part numbers associated with the item being defined according to one or more corresponding second part numbering schemes; and in response to identifying the one or more second part numbers associated with the item, search a database for a third cart number that is associated with the item and also cross-referenced to at least one second part number associated with the item, the third part number associated with the item being defined according to a third part numbering scheme, the first part number associated with the item being mapped to the third part number associated with the item through the at least one second part number associated with the item, wherein:

the first part number is not completely mapped to the third part number in that a plurality of second part numbers are associated with the item, at least some of these second part numbers are cross-referenced to the first part number but not cross-referenced to the third part number, and at least some of these second part numbers are cross-referenced to the third part number but not cross-referenced to the first part number; and the software is further operable to:
- determine a percentage of second part numbers to which both the first part number and the third part number are cross-referenced; and
- if the determined percentage is greater than a predetermined value, consider the third part number equivalent to the first part number for purposes of a particular application for the first part number.

6. Software for mapping between part numbers that are based on different part numbering schemes, the software being embodied in computer-readable media and when executed operable to:

receive a first part number associated with an item, the first part number associated with the item being defined according to a first part numbering scheme;

search a database for one or more second part numbers that are associated with the item and also cross-referenced to the first part number associated with the item, the one or more second part numbers associated with the item being defined according to one or more corresponding second part numbering schemes;

in response to identifying the one or more second part numbers associated with the item, search a database for a third part number that is associated with the item and also cross-referenced to at least one second part number associated with the item, the third part number associated with the item being defined according to a third part numbering scheme, the first part number associated with the item being mapped to the third part number associated with the item through the at least one second part number associated with the item;

access a first item to item specification to map the first part number to specification information for the item associated with the first part number, the first item to item specification having a first pointer to information identifying the item associated with the first part number and a second pointer to the specification information for the item associated with the first part number; and access a second item to item specification to map the specification information for the item associated with the third part number to the third part number, the second item to item specification having a first pointer to information identifying the item associated with the third part number and a second pointer to specification information for the item associated with the third part number, the specification information for the item associated with the third part number substantially matching the specification information for the item associated with the first part number.

7. A computer-implemented method for mapping between part numbers that are based on different part numbering schemes, comprising:

receiving a customer part number associated with an item, the customer part number associated with the item being defined according to a part numbering scheme of a corresponding customer;

searching a database for one or more manufacturer part numbers that are associated with the item and also cross-referenced to the customer part number associated with the item, the one or more manufacturer part numbers associated with the item each being defined according to a part numbering schemes of a corresponding manufacturer, a first item to item specification mapping the customer part number to specification information for the item associated with the customer part number, the first item to item specification having a first pointer to information identifying the item associated with the customer part number and a second pointer to the specification information for the item associated with the customer part number; and in response to identifying the one or more manufacturer part numbers associated with the item, searching a database for an internal part number that is associated with the item and also cross-referenced to at least one manufacturer part number associated with the item, the internal part number associated with the item being defined according to a part numbering scheme of a corresponding seller, a second item to item specification mapping the specification information for the item associated with the internal part number to the internal part number, the second item to item specification having a first pointer to information identifying the item associated with the internal part number and a second pointer to specification information for the item associated with the internal part number, the specification information for the item associated with the internal part number substantially matching the specification information for the item associated with the customer part number, the customer part number being mapped to the internal part number through the at least one manufacturer part number.

* * * * *

UNITED STATES PATENT AND TRADEMARK OFFICE
CERTIFICATE OF CORRECTION

PATENT NO. : 6,988,111 B2  
DATED : January 17, 2006  
INVENTOR(S) : Roland W. Chow et al.

It is certified that error appears in the above-identified patent and that said Letters Patent is hereby corrected as shown below:

<u>Column 9,</u>  
Line 31, "cart" should read -- part --.

<u>Column 12,</u>  
Line 7, "cart" should read -- part --.

Signed and Sealed this

Twenty-fifth Day of April, 2006

JON W. DUDAS  
*Director of the United States Patent and Trademark Office*